(12) United States Patent
Masuda et al.

(10) Patent No.: US 6,262,709 B1
(45) Date of Patent: Jul. 17, 2001

(54) LETTER INPUT APPARATUS AND METHOD

(75) Inventors: Ikuko Masuda, Kanagawa; Naoya Okamoto, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/982,808

(22) Filed: Dec. 2, 1997

(30) Foreign Application Priority Data

Dec. 19, 1996 (JP) .................................. 8-339520

(51) Int. Cl.[7] .................................................. G06F 15/02
(52) U.S. Cl. ................................ 345/141; 345/353
(58) Field of Search .................... 345/141, 142, 345/128, 352, 353, 354, 347, 326

(56) References Cited

FOREIGN PATENT DOCUMENTS

| | | |
|---|---|---|
| 0 615 195 | 9/1994 | (EP) . |
| 0 732 646 | 9/1996 | (EP) . |
| 0 782 064 | 7/1997 | (EP) . |

OTHER PUBLICATIONS

Cowart, *Mastering Windows™ 3.1, Special Edition*, Alameda, CA, Sybex Corp. pp. 176, 429–433, 1993.*

Patent Abstracts of Japan vol. 95, No. 8, Sep. 29, 1995 of JP 07 129 294 A (Alps Electric Co. Ltd.), May 19, 1995.

Patent Abstracts of Japan vol. 18, No. 278 (P–1743), May 26, 1994 of JP 06 044 214 A (Brother Ind. Ltd.), Feb. 18, 1994.

* cited by examiner

*Primary Examiner*—Steven Sax
(74) *Attorney, Agent, or Firm*—Frommer Lawrence & Haug, LLP; William S. Frommer; Gordon Kessler

(57) ABSTRACT

There can be presented a letter input apparatus and method which make it possible to speedily and easily select a necessary letter from many kinds of letters while using a control dial input apparatus. By providing a control dial input apparatus 11 for generating command signals for forward direction and backward direction revolutions and a press-down, a microcomputer 12 for controlling a letter to be displayed based on the command signals, an OSD controller 13 for generating image information out of letter information and a display unit for displaying the generated image information, selection is conducted by moving a one dimensional cursor with a step for selecting one group of letters arranged and displayed in two dimensional fashion and a step for selecting a letter from the selected group of letters.

5 Claims, 5 Drawing Sheets

FIG. 6

```
I N _ _ _ _ _ _ _ _ _ _ _ _
    A B C D E    a b c d e
    F G H I J    f g h i j        [◄———]
    K L M N O    k l m n o        [ alphabet]
    P Q R S T    p q r s t        [completion]
    [U]V W X Y   u v w x y
    Z            z
```

FIG. 7

```
I N V _ _ _ _ _ _ _ _ _ _
    A B C D E    a b c d e
    F G H I J    f g h i j        [◄———]
    K L M N O    k l m n o        [ alphabet]
    P Q R S T    p q r s t        [completion]
    U[V]W X Y    u v w x y
    Z            z
```

LETTER INPUT APPARATUS AND METHOD

BACKGROUND OF THE INVENTION

1. Field of the Invention

The present invention relates to a letter input apparatus and method which use a control dial input apparatus.

2. Description of the Related Art

In a case of inputting a letter on a menu screen by using a control dial input apparatus, there have been only three operating functions of the control dial input apparatus, namely, an upward direction revolution, a downward direction revolution and a dial press-down. Therefore, as shown in FIG. 3, it has been impossible to input a letter in a two dimensional fashion and, as shown in FIG. 2, it has been necessary that each letter is inputted by using one dimensional menu. FIG. 2 shows an operation carried out when letters of operation carried out when letters of "invention" are to be input. In FIG. 2, in a case when, for example, a third letter example, a third letter "V" is to be inputted after a first letter "I" and a second letter "N" are inputted, the control dial input apparatus has to be revolved to change over a letter displayed on a menu display from "A" to "V" through "B", "C", "D", . . . , "U" in an alphabetical order, and then the dial is pressed down to select the "V".

Instead of using the control dial input apparatus, there have been some apparatus for inputting a letter in a two dimensional fashion, as shown in FIG. 3, by using two dimensional input apparatus such as a cross key, a track ball and the like. However, although a display of the two dimensional input apparatus is easy to be looked, there is a problem that a space for it to be installed becomes larger and at the same time it is time consuming for operation. Therefore, as for a portable apparatus, the control dial input apparatus capable of realizing space saving has been used in many cases.

Kinds of letters to be inputted amount to about 140 in kinds of letters including a numeral, a symbol, an alphabet, Japanese letters called "hiragana" and the like. Therefore, when the letter is input by using only the one dimensional menu, a problem has occurred that it takes much time and trouble in selecting a letter.

SUMMARY OF THE INVENTION

In view of such aspects, it is an object of the present invention to propose a letter input apparatus which makes it possible to speedily and easily select a necessary letter from many kinds of letters with a control dial input device.

In order to achieve the above mentioned object, a letter input apparatus of the present invention has an input unit for generating command signals for forward direction and backward direction revolutions and a press-down, a control unit for controlling a letter to be displayed based on the command signals, a converting unit for generating image information from letter information, and a display unit for displaying the image information generated by the converting unit, which is characterized in that the display unit arranges and displays a letter to be displayed two dimensionally and the control unit has a mode for selecting a group of letters arranged and displayed two dimensionally as mentioned above and a mode for selecting a letter from the above mentioned selected group of the letters.

Also, in order to achieve the above mentioned object, a letter input method of the present invention is characterized by comprising a step for selecting a group of letters which are two dimensionally arranged and displayed, and a step for selecting a letter from the selected group, and the selection of the group of letters and the selection of the letter are conducted by one dimensional moving of a cursor.

BRIEF DESCRIPTION OF THE DRAWINGS

FIG. 3 is an example of a screen display of a conventional cross key or the like;

FIG. 6 is an example of a screen display of a video camera showing a preferable embodiment of the present invention;

FIG. 7 is an example of a screen display of a video camera which is a preferable embodiment of the present invention.

DESCRIPTION OF THE PREFERRED EMBODIMENT

Hereinafter, the present invention will be practically explained with reference to the drawings.

Figure 1:
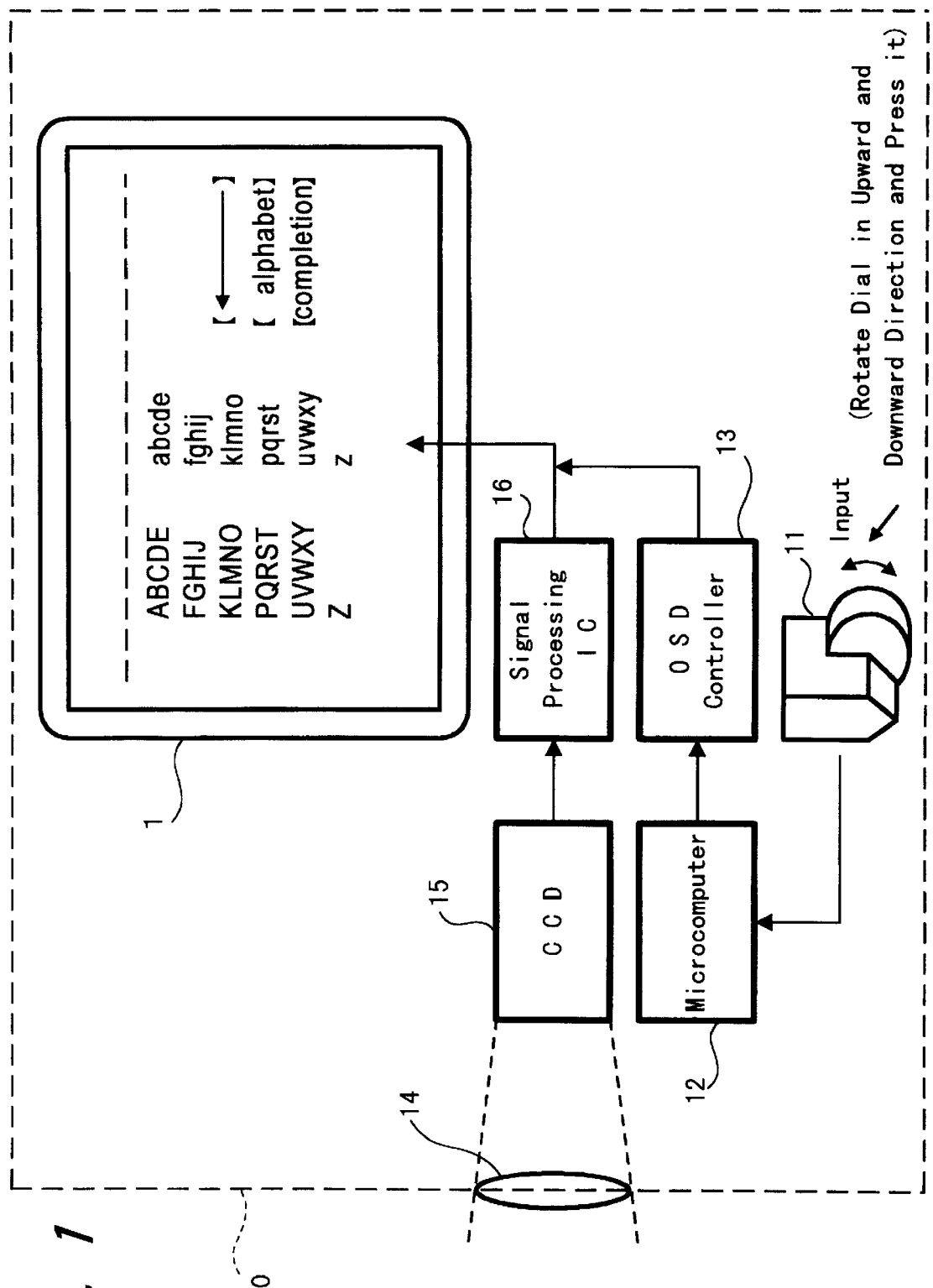
FIG. 1 is a block diagram showing a preferable embodiment of the present invention.
Figure 2:
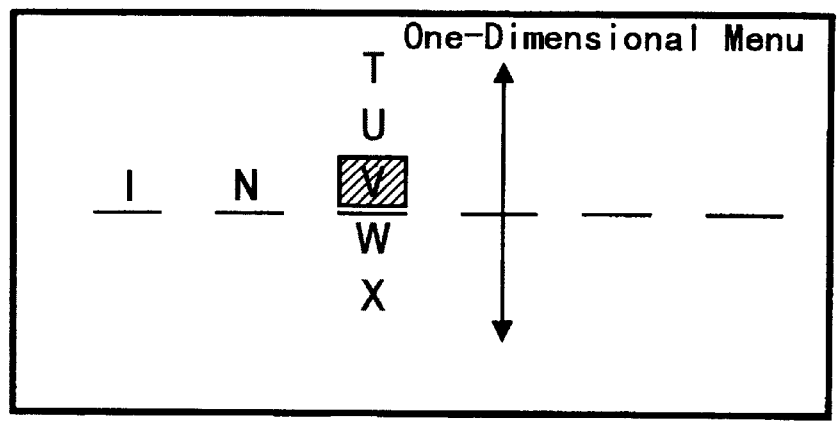
FIG. 2 is an example of a screen display of a conventional control dial input apparatus.
Figure 3:
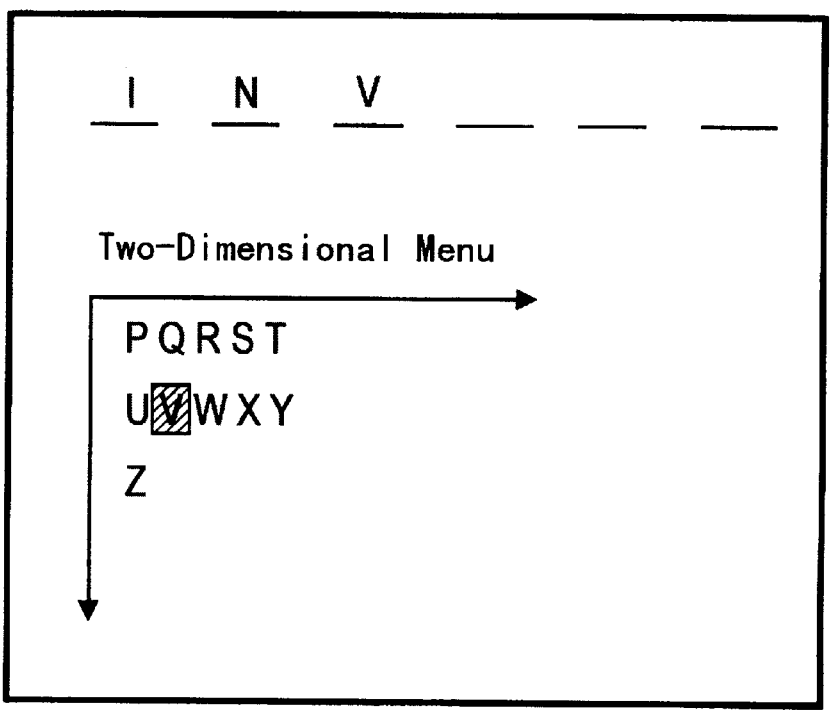

FIG. 1 is a block diagram showing an arrangement of a video camera equipped with a letter input apparatus as a preferable embodiment of the present invention. In FIG. 1, reference numeral 1 is a display screen of the display unit such as an LCD and the like loaded on a video camera, reference numeral 10 is a video camera equipped with a letter input control apparatus, reference numeral 11 is a control dial input apparatus as an input unit for inputting a letter, 12 is a microcomputer as a control unit, reference numeral 13 is an OSD (On Screen Display) controller for converting a letter input to an image, reference numeral 14 is a lens, reference numeral 15 is a CCD (Charge Coupled Device) and reference numeral 16 indicates a signal processing IC.

On the display screen 1 are overlappingly displayed image information inputted by the lens 14 and letter information generated by the OSD controller 13. An image incident on the lens 14 is converted to an electric signal by the CCD 15 and, by the signal processing IC 16, is converted to an image information capable of being displayed on the display screen 1. Meanwhile, based on an input signal by the control dial input apparatus 11, the OSD controller 13 converts the letter information to the image information capable of being displayed on the display screen 1 under the control of the microcomputer 12.

At that time, the control dial input apparatus 11 can transmit three kinds of control signals to the microcomputer 12, such as an upward direction revolution, a downward direction revolution and a dial press-down.

Hereinafter, with reference to FIG. 4 through FIG. 8, how the letter information displayed on the display screen 1 corresponding to a control signal from the control dial input apparatus 11 is generated by the microcomputer 12 and the OSD controller 13 will be explained. Meanwhile, FIG. 4 through FIG. 8 are diagrams for representing displayed contents on the display screen 1 at a time of producing a title to be attached to a video image by using the control dial input apparatus 11.

Figure 4:
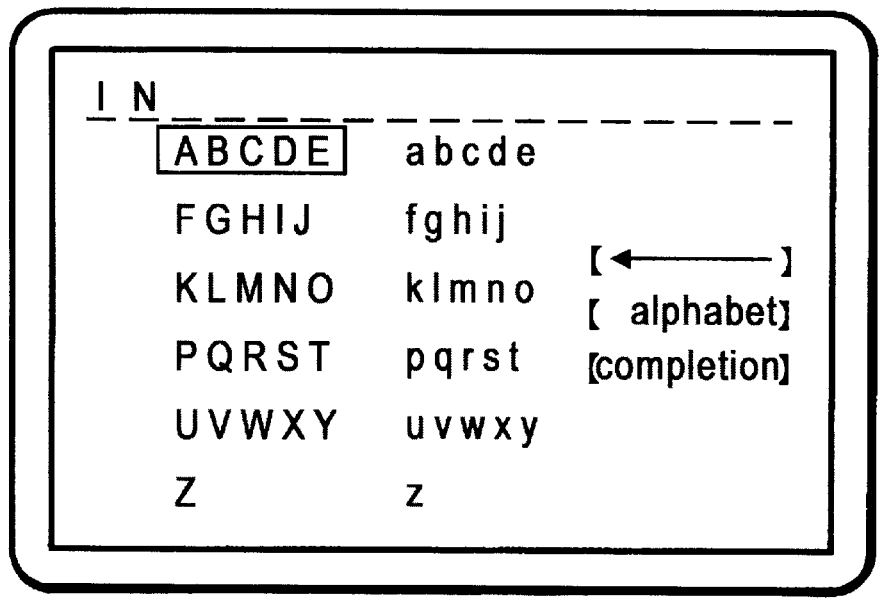
FIG. 4 is an example of a screen display of a video camera showing a preferable embodiment of the present invention.
Figure 5:
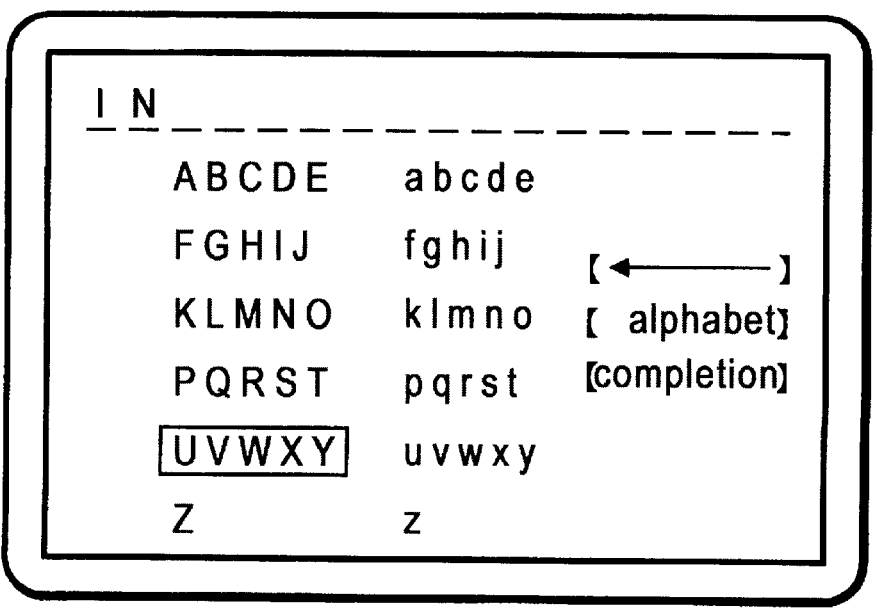
FIG. 5 is an example of a screen display of a video camera showing a preferable embodiment of the present invention.

FIG. 4 is a diagram showing a screen in a state before a third letter "V" is about to be inputted and displayed at a title area after a first letter "I" and a second letter "N" are inputted at a time of producing a title called "INVENTION". On the screen, 52 alphabet letters form groups of every 5 letters, and at this time point, a group "AB" is being selected. In order to input the third letter "V", because the "V" belongs to a group "UVWXY", the control dial input apparatus 11 is revolved downward to select the group "UVWXY" as shown in FIG. 5. At this juncture, the group selected on the screen shifts from "ABCDE" to "UVWXY" through "FGHI ", "KLMNO", "PQRST" in this order.

Although the letter "A" is apart from the letter "V" by 21 letters, it takes only four lines to travel according to the selection by the above mentioned groups.

Figure 8:
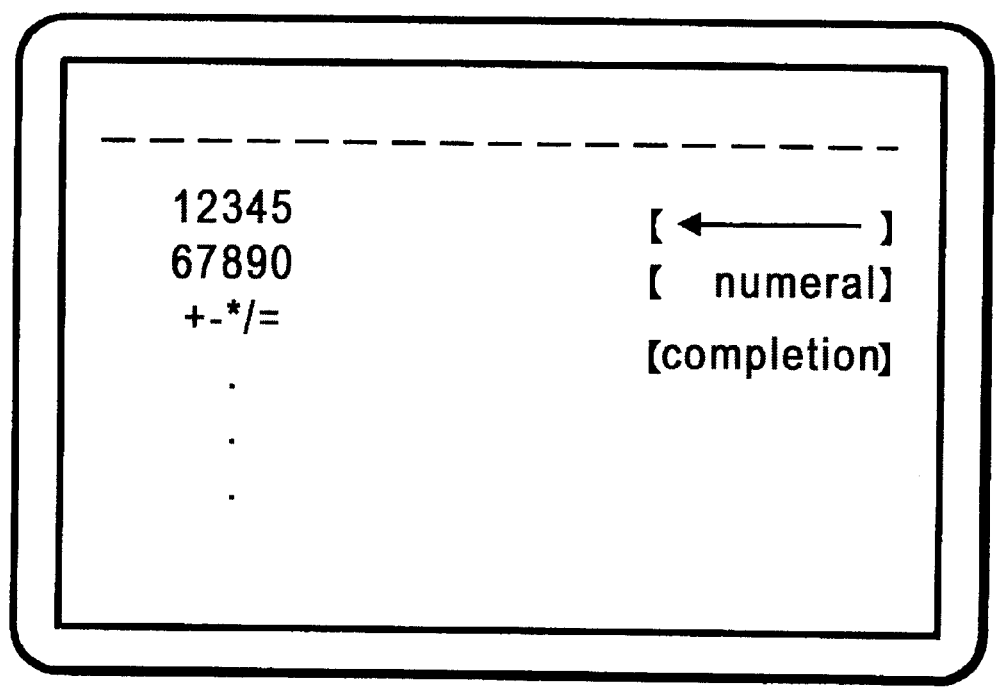
FIG. 8 is an example of a screen display of a video camera showing a preferable embodiment of the present invention.

Meanwhile, when "[numeral]" is selected in FIG. 4, the screen changes over to a screen for displaying an numeral, a symbol and the like as shown in FIG. 8.

After the group "UVWXY" is selected, by pressing the control dial input apparatus 11 down, the selection is decided. When the selection is decided, as shown in FIG. 6, only "U" out of the group "UVWXY" becomes a state of being selected.

Next, when the control dial input apparatus 11 is revolved further downward, a selected letter moves from "U" to "V" in this order. As shown in FIG. 7, when the control dial input apparatus 11 is pressed down after selecting the "V", the third letter "V" is decided and the given letter is registered as the third letter of the title and displayed. Meanwhile, when the control dial input apparatus 11 is revolved further upward, a selected letter returns from "V" to "U" in this order.

Here, when the group is erroneously selected, for example, when a group "PQRST" is selected instead of the group "UVWXY", by revolving the control dial input apparatus 11 downward, a letter for selection moves from "P" to "T" through "Q", "R" and "S" in this order and with its further downward revolution, the whole group "UVWXY" is selected next to "T". After that, as the letter "U" is selected by pressing again the control dial input apparatus 11 down to decide the given selection, the letter "V" is preferably decided in accordance with the above mentioned procedure.

Further, when a once selected group erroneously moves to another group, because the once selected group is memorized, one letter of the given group is automatically selected at a time of returning again to the group. For example, even when after selecting the group "PQRST", the group erroneously moves to the group "UVWXY", if the control dial input apparatus 11 is revolved upward, the "T" is selected. Also, even when after selecting the group "UVWXY", the group erroneously moves to the group "KLMONO" by revolving the control dial input apparatus 11 downward, the "P" is selected.

Also, at a time of inputting the title "INVENTION", when "INW" is erroneously inputted, by selecting a "[←]" on the display screen shown in FIG. 4, the last inputted "W" is erased, thereby making it possible to input again.

Further, after inputting of the title "INVENTION" is finished, when a "[completion]" is selected on the display screen shown in FIG. 4, the inputting of the title is completed.

Meanwhile, in the above embodiment of the present invention, an explanation has been made on the video camera, but the letter input apparatus according to the present invention is not limited to the video camera, and it is needless to say that it also includes an arbitrary apparatus and method in which a letter is inputted by way of the control dial input apparatus such as in a cellular phone, an electronic pocket notebook, a television remote controller, a set top box and the like.

As it is apparent from the above explanation, according to the letter input apparatus and method of the present invention, it is possible to make two dimensional selection by way of the control dial input apparatus in a one dimensional input type, doesn't occupy much space and at the same time, is capable of being operated by a single hand and conducting letter input in good operability.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A camera comprising:

image sensing means for generating an image data signal;

data processing means for converting said image data signal to an image information to be displayed;

input means adapted to be revolved in a single dimension and pressed down for generating a command signal;

control means for generating a control signal for displaying character information based on said generated command signal; and display means for displaying said image information or said character information;

said display means displaying said character information to be inputted two dimensionally, said control means including a mode for selecting a group of the character information to be displayed from one dimension of said two-dimensionally displayed character information and a mode for selecting a character information from said selected group of character information from a second dimension of said two-dimensionally displayed character information.

2. The camera of claim 1, wherein said control means selects said group of the character information or said character information based on a revolution command from said input means and changes its mode based on a press-down command from said input means.

3. The camera of claim 1, wherein said control means selects said group of the character information or said character information and changes its mode based on a revolution command from said input means.

4. A method for inputting character data in a camera comprising the steps of:

displaying characters to be inputted two dimensionally;

generating a command signal by revolving an input means in a single dimension or by pressing down said input means;

selecting in a first mode a group of characters being lined up in one dimension from said characters displayed two dimensionally based on said command signal; and selecting a character from said selected in a second mode group of characters being lined in one dimension based on said command signal.

5. A character input apparatus in a camera comprising:

input means adapted to be revolved in a single dimension and pressed down for generating a command signal;

control means for generating a control signal for displaying character information based on said command signal; and display means for displaying characters to be inputted two dimensionally;

wherein said control means includes a mode for selecting a group of characters being lined in one dimension from said characters displayed two dimensionally and a mode for selecting a character from said selected group of characters being lined in one dimension.

* * * * *